(12) United States Patent
Tamatani et al.

(10) Patent No.: US 8,098,359 B2
(45) Date of Patent: Jan. 17, 2012

(54) LIQUID CRYSTAL DISPLAY DEVICE HAVING AN OPTIMIZED THICKNESS OF A TRANSPARENT CONDUCTIVE FILM AND METHOD OF MANUFACTURING THE SAME

(75) Inventors: Akira Tamatani, Kumamoto (JP); Takanori Okumura, Tokyo (JP)

(73) Assignee: Mitsubishi Electric Corporation (JP)

( * ) Notice: Subject to any disclaimer, the term of this patent is extended or adjusted under 35 U.S.C. 154(b) by 690 days.

(21) Appl. No.: 12/269,441

(22) Filed: Nov. 12, 2008

(65) Prior Publication Data

US 2009/0128761 A1 May 21, 2009

(30) Foreign Application Priority Data

Nov. 16, 2007 (JP) .................... 2007-297489

(51) Int. Cl.
*G02F 1/1343* (2006.01)
*G02F 1/13* (2006.01)
(52) U.S. Cl. ............... 349/148; 349/139; 349/187
(58) Field of Classification Search .............. 349/139, 349/148, 187; 438/30
See application file for complete search history.

(56) References Cited

U.S. PATENT DOCUMENTS

| | | |
|---|---|---|
| 5,870,160 A | 2/1999 | Yanagawa et al. |
| 5,893,625 A | 4/1999 | Tamatani et al. |
| 5,905,553 A | 5/1999 | Matsukawa et al. |
| 5,959,712 A | 9/1999 | Morii et al. |
| 6,141,078 A | 10/2000 | Morii et al. |
| 6,166,795 A | 12/2000 | Fujii et al. |
| 6,191,837 B1 | 2/2001 | Fujimaki et al. |
| 6,313,890 B1 | 11/2001 | Tamatani |
| 6,335,779 B1 | 1/2002 | Morii et al. |
| 6,356,329 B1 | 3/2002 | Tamatani et al. |
| 6,493,054 B2 | 12/2002 | Mizunuma et al. |
| 7,362,409 B2 | 4/2008 | Tamatani et al. |

FOREIGN PATENT DOCUMENTS

| | | |
|---|---|---|
| JP | 1-96953 | 4/1989 |
| JP | 9-105918 | 4/1997 |
| JP | 10-293207 | 11/1998 |

*Primary Examiner* — Mark Robinson
*Assistant Examiner* — Paul Lee
(74) *Attorney, Agent, or Firm* — Studebaker & Backett PC; Donald R. Studebaker

(57) ABSTRACT

A liquid crystal display device in accordance with one aspect of the present invention includes a liquid crystal panel including a electrode substrate, a opposed substrate disposed opposite to the electrode substrate, and liquid crystal sandwiched between the electrode substrate and the opposed substrate, and a transparent conductive film formed on the opposite surface of the opposed substrate to the liquid crystal, wherein the thickness d1 (cm) of the transparent conductive film satisfies the equation $d1 > 0.5 \times R1 \times \in_0 \times \in_r \times S/d0$ (cm), where R1 ($\Omega \cdot cm$) is specific resistance of the transparent conductive film, $\in_0$ (F/m) is the electric constant, $\in_r$ (F/m) is relative dielectric constant of the opposed substrate, d0 (cm) is thickness of the opposed substrate, and S (m$^2$) is size of the display area of the liquid crystal panel.

14 Claims, 6 Drawing Sheets

LIQUID CRYSTAL DISPLAY DEVICE HAVING AN OPTIMIZED THICKNESS OF A TRANSPARENT CONDUCTIVE FILM AND METHOD OF MANUFACTURING THE SAME

BACKGROUND OF THE INVENTION

1. Field of the Invention

The present invention relates to a liquid crystal display device and a method of manufacturing the same.

2. Description of the Related Art

The principles of the display operation of a typical liquid crystal display device are explained hereinafter. A liquid crystal display device includes two substrates disposed opposite to each other with a liquid crystal layer interposed therebetween. A pixel electrode and a common electrode are formed in an area that corresponds to each pixel. The alignment state of liquid crystal molecules is controlled by voltage applied between these electrodes. A polarizing plate is disposed on each of the incoming light side and the outgoing light side of the pair of two opposed substrates. The light transmittance is controlled by changing the alignment state of the liquid crystal molecules such that a desired image is displayed.

There are generally two categories for the driving methods of liquid crystal display devices. They are called a vertical electric field mode and a horizontal electric field mode respectively. In a vertical electric field mode liquid crystal display device, a pixel electrode composed of a transparent electrode is formed in an area corresponding to each pixel in one of the two substrates that are opposed to each other with a liquid crystal layer interposed therebetween, and a common electrode composed of a transparent electrode is formed in the other one of the two substrates.

In a horizontal electric field mode liquid crystal display device, a pixel electrode and a common electrode are formed in an area corresponding to each pixel on the surface of the liquid crystal layer side of either or both of the two substrates that are opposed to each other with a liquid crystal layer interposed therebetween. The application of voltage between the pixel electrode and the common electrode produces an electric field having a component roughly parallel to the substrate. The generated electric filed having the component roughly parallel to the substrate changes the alignment state of the liquid crystal molecules, so that the light transmittance is controlled and a desired image is displayed.

In recent years, liquid crystal display devices have been used in a wide range of applications such as TVs, handheld data terminals, and monitors for personal computers. As a result, they may come under the influence of various external environments. Especially, when the surface is electrically charged by static electricity or the like, it may adversely affect the alignment state of the liquid crystal through the electrode substrate, or may even destroy the TFTs (Thin Film Transistors). Therefore, when a liquid crystal display device is electrically charged, it needs to immediately remove the charged electricity. Especially in the case of a horizontal electric field liquid crystal display device, the effect on the liquid crystal alignment state is significant and the display quality is remarkably deteriorated since no electrode is formed on one of the substrates for driving the liquid crystal.

To solve these problems, Japanese Unexamined Patent Application Publication Nos. 9-105918, 10-96953, and 10-293207 disclose a method in which a transparent conductive film is formed on the back surface of the substrate and electrically connected to a ground. This structure can reduce effects to the alignment of the liquid crystal and to the thin-film transistors caused by static electricity generated on the surface of the liquid crystal display device.

Conventionally, a color filter substrate having a transparent conductive film such as an ITO film formed on its back surface (the surface opposite to the surface on which the film of color material or the like is formed) has been used. In recent years, the demand for thinner and lighter liquid crystal display devices has grown, and therefore the substrates need to be thinned. Because of the restrictions on manufacturing equipment and manufacturing processes, substrates having a thickness thinner than a certain thickness causes problems in conveyance or a similar process due to the bending of the substrates, and therefore cannot be manufactured. Therefore, substrates need to be thinned by grinding or etching after the color filter substrates and the TFT substrates are superimposed with each other. Accordingly, a color filter substrate on which the transparent conductive film is formed in advance cannot be used.

As described above, the transparent conductive film needs to be formed after the thinning process of the substrate. A typical method of forming a transparent conductive film is a sputtering method, which is conventionally used to form an ITO film. However, the space between the superimposed substrates is hermetically sealed by sealing the peripheral portion thereof with resin or the like in order to prevent the infiltration of water during the thinning process of the substrates. Therefore, if the transparent conductive film is formed in a vacuum like the case of a sputtering method, the substrates may be cracked due to the pressure difference between the inside and outside of the substrates. Accordingly, since vacuum film formation cannot be used as a proper method of forming a conductive film for thin substrates, an application method such as a spin coat method has been examined.

In recent years, the demand for improving the performance of liquid crystal display devices has been increasingly growing. Therefore, even the reduction in the transmittance due to the formation of the transparent conductive film has been regarded as a problem. To minimize the reduction in the transmittance, the film thickness of the transparent conductive film needs to be thinned. However, the resistance of the transparent conductive film needs to be reduced in order to reduce the effect of static electricity. Accordingly, the transmittance and the resistance of the transparent conductive film behave in a mutually contradictory manner with respect to the film thickness. The optimal values for them are not clearly established until now, and conductive films having a resistance larger than necessary have been used in the past. Therefore, the transmittance has been sacrificed, and therefore the display performance of liquid crystal display devices has not been able to be fully exploited.

In addition, a formation method of a transparent conductive film where the process is carried out in a vacuum, such as a sputtering method, cannot be applied to reduce the thickness of the substrate, because it may causes a crack in the substrate as described above. Therefore, the transparent conductive film needs to be formed by using a wet method such as a spin coat method. However, a transparent conductive film formed by the wet method has not been able to be applied since it has a higher resistance in comparison with an ITO film or the like.

The present invention has been made in view of such circumstances. One of the objects of the present invention is to provide a liquid crystal display device that is capable of suppressing the effect of static electricity and has improved display performance by optimizing the thickness of the transparent conductive film, and a method of manufacturing the same.

SUMMARY OF THE INVENTION

In accordance with one aspect of the present invention, a liquid crystal display device includes: a liquid crystal panel including a first substrate, a second substrate disposed opposite to the first substrate, and liquid crystal sandwiched between the first and second substrates; and a transparent conductive film formed on the opposite surface of the first substrate to the liquid crystal; wherein the thickness d1 (cm) of the transparent conductive film satisfies a following equation:

$$d1 > 0.5 \times R1 \times \in 0 \times \in r \times S/d0 \text{ (cm)}$$

where R1 (Ω·cm) is specific resistance of the transparent conductive film, ∈0 (F/m) is the electric constant, ∈r (F/m) is relative dielectric constant of the first substrate, d0 (cm) is thickness of the first substrate, and S (m²) is size of the display area of the liquid crystal panel.

In accordance with another aspect of the present invention, a method of manufacturing a liquid crystal display device includes: forming a liquid crystal panel by injecting liquid crystal between the first and second substrates; and forming a transparent conductive film on the opposite surface of the first substrate to the liquid crystal; wherein the transparent conductive film satisfies a following equation:

$$d1 > 0.5 \times R1 \times \in 0 \times \in r \times S/d0 \text{ (cm)}$$

where R1 (Ω·cm) is specific resistance of the transparent conductive film, d1 (cm) is film thickness of the transparent conductive film, ∈0 (F/m) is the electric constant, ∈r (F/m) is relative dielectric constant of the first substrate, d0 (cm) is thickness of the first substrate, and S (m²) is size of the display area of the liquid crystal panel.

The present invention can provide a liquid crystal display device that is capable of suppressing the effect of static electricity and has improved display performance by optimizing the thickness of a transparent conductive film, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE EXEMPLARY EMBODIMENTS

Embodiments to which the present invention is applicable are explained hereinafter. The following embodiments are explained only for illustrative purpose, and the present invention is not limited to those embodiments. The descriptions and the drawings are partially omitted and simplified as appropriate for the clarification of the explanation in the following explanation.

As a result of the study conducted to solve the above-mentioned problems, the inventors have found out that the resistance of a transparent conductive film necessary to suppress the effect of static electricity depends on the size of the display area, and the thickness and the dielectric constant of the substrate of the liquid crystal display device. The present invention can suppress the effect of static electricity and improve the display performance by optimizing the film thickness of the transparent conductive film while taking these parameters into consideration.

Figure 1:
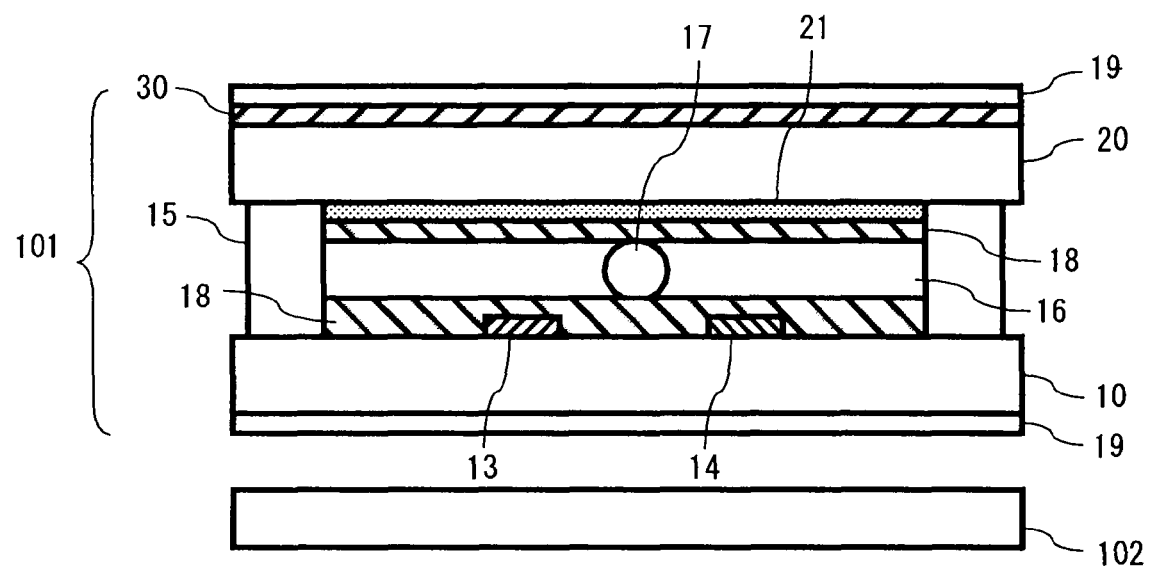
FIG. 1 is a cross section showing the structure of a liquid crystal display device in accordance with an embodiment of the present invention.
Figure 2:
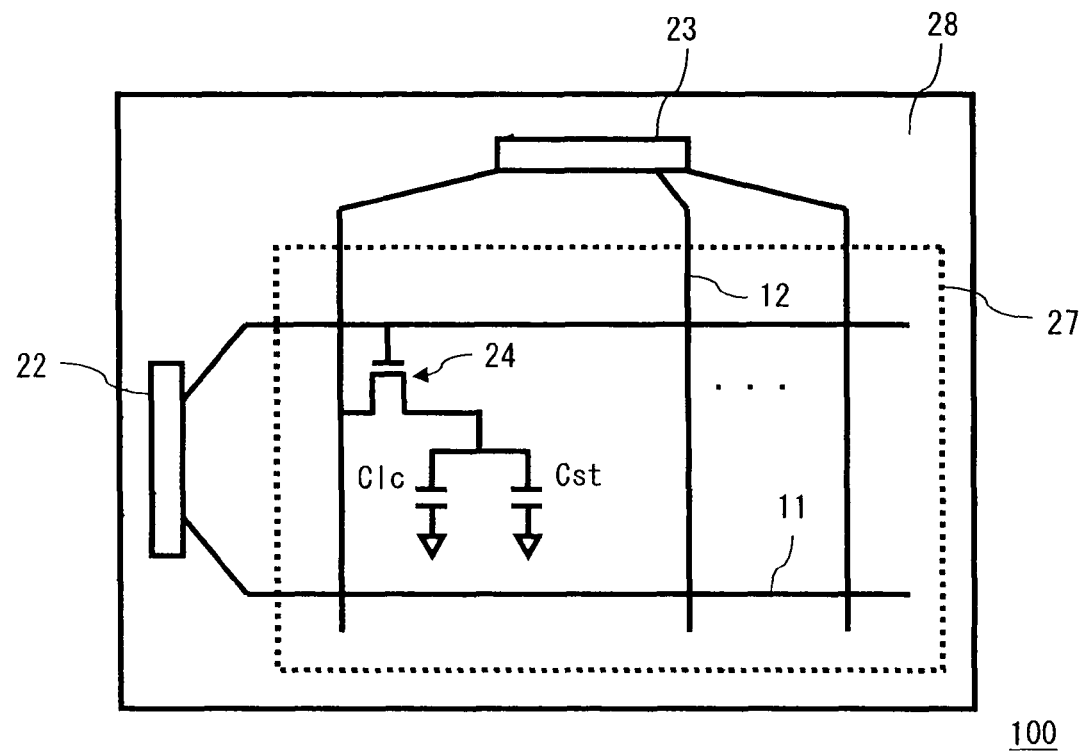
FIG. 2 is a plane view showing the structure of a liquid crystal display device in accordance with an embodiment of the present invention.
Figure 3:
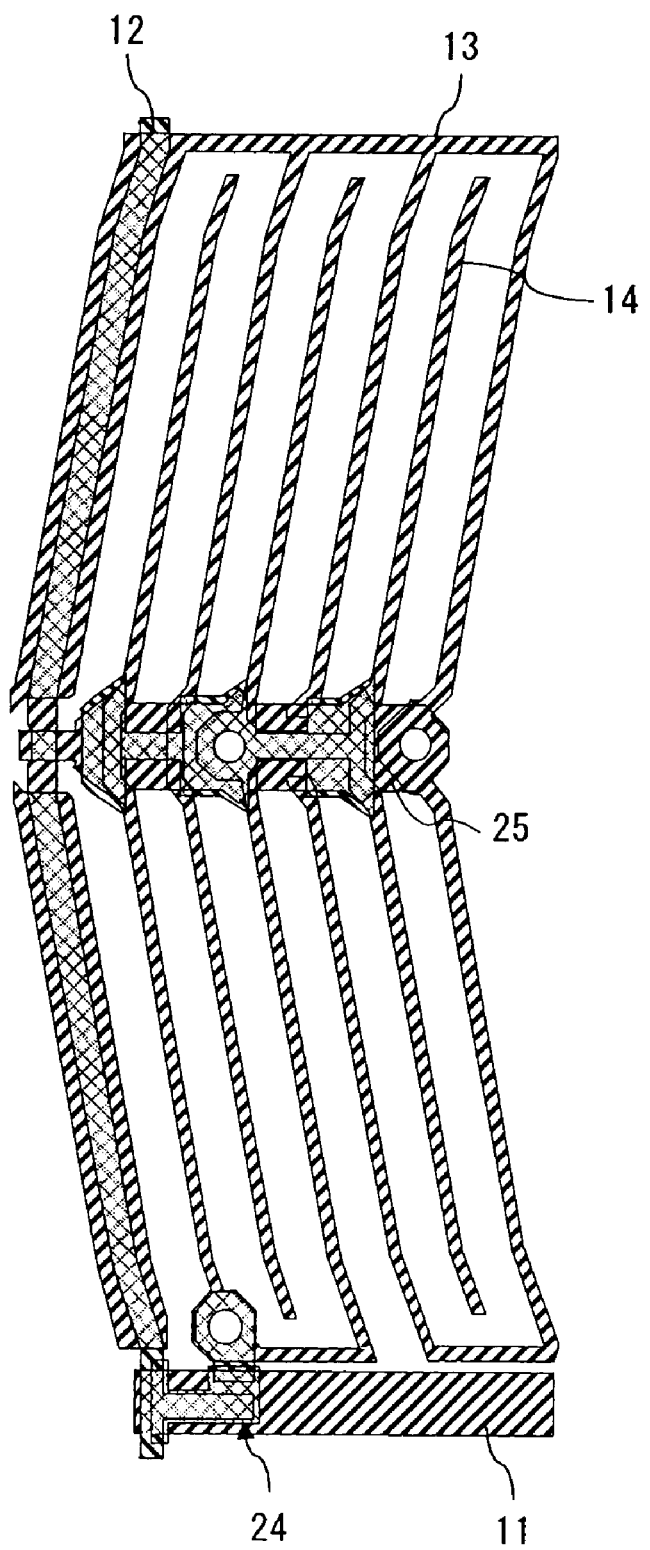
FIG. 3 shows the pixel structure of a liquid crystal display device in accordance with an embodiment of the present invention.
Figure 4:
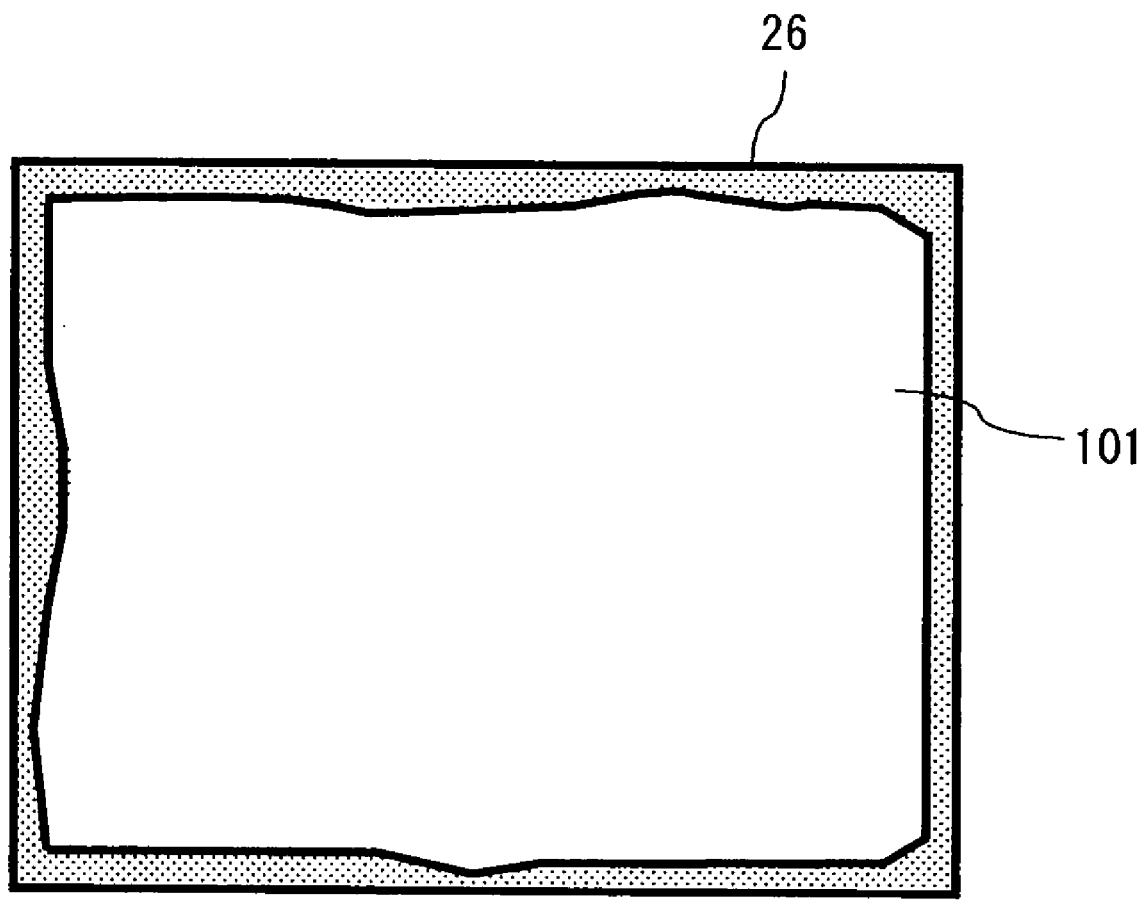
FIG. 4 is a plane view showing the structure of a liquid crystal display panel in accordance with an embodiment of the present invention.

The structure of an embodiment in accordance with the present invention is explained hereinafter with reference to FIGS. 1-4. FIG. 1 is a cross section showing the structure of a liquid crystal display device 100 in accordance with an embodiment of the present invention, and FIG. 2 is a plane view thereof. Furthermore, FIG. 3 is a plane view showing the pixel structure of the liquid crystal display device 100. FIG. 4 is a plane view showing the structure of a liquid crystal panel 101. In this embodiment, a horizontal electric field liquid crystal display device is explained as an example of a liquid crystal display device.

As shown in FIGS. 1 and 2, the liquid crystal display device 100 includes a liquid crystal panel 101 and a backlight 102. The liquid crystal panel 101 includes a electrode substrate (TFT substrate) 10, gate lines (scanning lines) 11, source lines (signal lines) 12, pixel electrodes 13, common electrodes 14, sealing material 15, liquid crystal 16, spacers 17, alignment layers 18, polarizing plates 19, a opposed substrate 20, a color filter 21, a gate driver 22, a source deriver 23, TFTs 24, auxiliary capacitance lines 25, resin 26, and a transparent conductive film 30. One of the characteristic features of the present invention is the transparent conductive film 30 formed on the opposed substrate 20.

As shown in FIG. 1, the liquid crystal panel 101 has such a structure that the liquid crystal 16 is sealed within the space defined by the electrode substrate 10, the opposed substrate 20 that is disposed opposite to the electrode substrate 10, and the sealing material 15 that is used to bond these substrates together. Both substrates are maintained with a certain gap therebetween by the spacers 17. Light transparent insulating substrates such as glass substrates are used as the electrode substrate 10 and the opposed substrate 20. The alignment layer 18 is formed above each of the above-mentioned electrodes, lines, and the likes in the electrode substrate 10. Meanwhile, the color filter 21 and the alignment layer 18 are formed on the surface of the opposed substrate 20 that is opposed to the electrode substrate 10. Incidentally, in the color filter 21, a BM (Black Matrix) (not shown) is disposed between each two adjacent color material, and an overcoat layer is provided so as to cover them.

The polarizing plate 19 is stuck on the outer surface of the electrode substrate 10. Meanwhile, the transparent conductive film 30 is formed on the outer surface of the opposed substrate 20, and the polarizing plate 19 is stuck on the transparent conductive film 30. That is, the transparent conductive film 30 is formed, among the two substrates constituting the part of the liquid crystal panel 101, on the opposed substrate 20 on which no electrode (e.g., a pixel electrode 13 and a common electrode 14) is formed for driving the liquid crystal 16. In FIG. 1, the transparent conductive film 30 is formed on the surface, which is opposite to the liquid crystal 16, of the opposed substrate 20, i.e., the substrate farther from the backlight 102 among the two substrates constituting a part of the liquid crystal panel 101. That is, the transparent conductive film 30 is formed on the viewable side surface of the opposed substrate 20, which is the substrate located on the viewable side.

The transparent conductive film 30 is supplied with ground potential. The transparent conductive film 30 acts as a shield against external static electricity or the like. Therefore, even if high electrical potential such as static electricity is accidentally applied from the outside of the liquid crystal panel 101, it is possible to suppress the effect of the static electricity and prevent the occurrence of abnormal display. A film containing metal oxide such as ITO, zinc oxide, and tin oxide, or a conductive polymer such as polythiophene and polypyrrole can be used for the transparent conductive film 30. The film thickness of the transparent conductive film 30 is explained in detail later.

The backlight 102 is provided on the back surface of the liquid crystal panel 101. The backlight 102 illuminates the liquid crystal panel 101 from the non-viewable side of the liquid crystal panel 101. For example, a typical backlight structure having a light source, an optical waveguide plate, a reflection sheet, a diffusing sheet, a prism sheet, reflective polarizing sheet, and the like may be used for the backlight 102.

As shown in FIG. 2, a plurality of gate lines 11 and a plurality of source lines 12 are formed on the electrode substrate 10. The plurality of gate lines 11 are arranged in parallel to each other. Similarly, The plurality of source lines 12 are also arranged in parallel to each other. The gate lines 11 and the source lines 12 are formed such that they intersect each other with an insulating layer interposed therebetween.

Furthermore, a TFT (Thin Film Transistor) 24 is provided in the vicinity of each intersection of the gate line 11 and the source line 12. Furthermore, a pixel electrode 13 is formed in each area defined by neighboring gate line 11 and source line 12. The area defined by neighboring gate line and source line becomes a pixel. Therefore, the pixels are arranged in matrix on the electrode substrate 10. The area in which a plurality of pixels are formed becomes a display area 27. The gate and the source of the TFT 24 are connected to the gate line 11 and the source line 12 respectively.

The gate driver 22 and the source driver 23 are provided on a peripheral area 28 of the electrode substrate 10. The gate lines 11 extend from the display area 27 to the peripheral area 28. Then, the gate lines 11 are connected to the gate driver 22 in an edge portion of the electrode substrate 10. Similarly, the source lines 12 extend from the display area 27 to the peripheral area 28. Then, the source lines 12 are connected to the source driver 23 in another edge portion of the electrode substrate 10.

As shown in FIG. 3, the pixel electrode 13, which is composed of plural electrodes arranged roughly parallel to the source line 12 and has a shape like the teeth of a comb, is connected to the TFT 24 in this embodiment of the present invention. Furthermore, the common electrode 14 having a shape like the plural teeth of a comb is provided between the plural electrodes of the pixel electrode 13 such that they are staggered each other. In this way, a liquid crystal capacitance Clc is formed by liquid crystal disposed between the pixel electrode 13 and the common electrode 14. Accordingly, the pixel electrodes 13 and the common electrodes 14, which are used to drive the liquid crystal 16, are formed only on the electrode substrate 10, but are not formed on the opposed substrate 20. The pixel electrodes 13 and the common electrodes 14 are formed from transparent conductive films such as ITO (Indium Tin Oxide) films. The application of voltage to the liquid crystal 16 located between the pixel electrode 13 and the common electrode 14 produces an electric field roughly parallel to the substrate surface, which is applied to the liquid crystal 16.

Furthermore, the auxiliary capacitance line 25 is formed in the vicinity of the center of each pixel. The auxiliary capacitance line 25 is connected to the common electrode 14 through a contact hole. An auxiliary capacitance Cst is formed by an insulating film interposed between the pixel electrode 13 and the auxiliary capacitance line 25. The source driver 23 supplies gray scale signals (signal potential) in accordance with an externally-input display signal to the source lines 12. The gate driver 22 supplies gate potential used to turn on and off the TFTs 24 to the gate lines 11. Furthermore, the common electrodes 14 are supplied with common potential. The electric field applied to the liquid crystal 16 is controlled by supplying the signal potential to the pixel electrode 13 through the TFT 24 with respect to the common electrode 14 that is maintained at the common potential such that a desired image is displayed.

As shown in FIG. 4, the resin 26 is formed in the peripheral portion of the bonded electrode substrate 10 and opposed substrate 20 in this embodiment of the present invention. The resin 26 is formed to prevent water from infiltrating between the electrode substrate 10 and the opposed substrate 20 when the thinning process is carried out on the electrode substrate 10 and the opposed substrate 20. The resin 26 seals the gap between the electrode substrate 10 and the opposed substrate 20, and creates a hermetically sealed state.

The film thickness of the transparent conductive film 30 is explained in detail hereinafter. As stated above, the present invention is to improve display performance such as transmittance by optimizing the film thickness of the transparent conductive film 30, which is used to prevent damage caused by static electricity.

If the specific resistance of the transparent conductive film 30 is R1 (Ω·cm), the electric constant is ∈0 (F/m), the relative dielectric constant of the opposed substrate 20 is ∈r (F/m), the thickness of the opposed substrate 20 is d0 (cm), and the size of the display area of the liquid crystal panel 101 is S (m²), the thickness d1 (cm) of the transparent conductive film 30 satisfies the following formula.

$$d1 > 0.5 \times R1 \times \in 0 \times \in r \times S/d0 \text{(cm)} \tag{1}$$

In this way, the optimization of the thickness of the transparent conductive film can suppress the effect of static electricity and improve the display performance.

An example where a glass substrate is used as the opposed substrate 20 is explained hereinafter. If the initial electrification voltage is V0, the resistance of the transparent conductive film 30 is R, and the capacitance of the glass (or polarizing plate) is C, the surface potential Vt after the lapse of a certain time t (sec) is expressed by the following equation (1).

$$Vt = V0 \times \exp(-t/CR) \tag{2}$$

By developing this equation for t, the following equation is obtained.

$$t = -CR \times \ln(Vt/V0) \tag{3}$$

Assuming that the charged electricity is removed within t (set), it is expressed as follows.

$$t > -CR \times \ln(Vt/V0) \tag{4}$$

By developing this inequality for R, the following equation is obtained.

$$R < (-1) \times (t/C)(1/\ln(Vt/V0)) \quad (5)$$

Furthermore, the specific resistance R1 (Ω·cm) and the thickness d1 (cm) of the transparent conductive film 30 are expressed as follows.

$$R = R1/d1 \quad (6)$$

If that the size of the display area of the liquid crystal panel 101 is S (m$^2$), the relative dielectric constant of the glass is ∈r (F/m), the electric constant is ∈0 (F/m), and the thickness of the glass is d0 (cm), the capacitance C of the glass is expressed by the following equation (7).

$$C = \in 0 \times \in r \times S/d0 \quad (7)$$

From the formulas (5), (6), and (7), the following formula is obtained.

$$d1 > (-1/t) \times \ln(Vt/V0) \times R1 \times \in 0 \times \in r \times S/d0 \quad (8)$$

By assuming that, for example, the initial electrification voltage V0=10000 (V), Vt=1 (V), and the disappearance time (in which the voltage decreases to Vt) t=10 sec, and substituting these values for the corresponding variables of the part of the equation (8) relating to the electricity removal performance, i.e., (−1/t)×ln(Vt/V0), the following relation is obtained.

$$d1 > 0.92 \times R1 \times \in 0 \times \in r \times S/d0 \text{(cm)} \quad (9)$$

Accordingly, by adjusting the film thickness d1 (cm) so as to satisfy the above-described equation, the electricity is removed from 10000 (V) to 1 (V), i.e., by the factor of 1/10000 within the desired disappearance time of 10 sec.

Figure 5A:
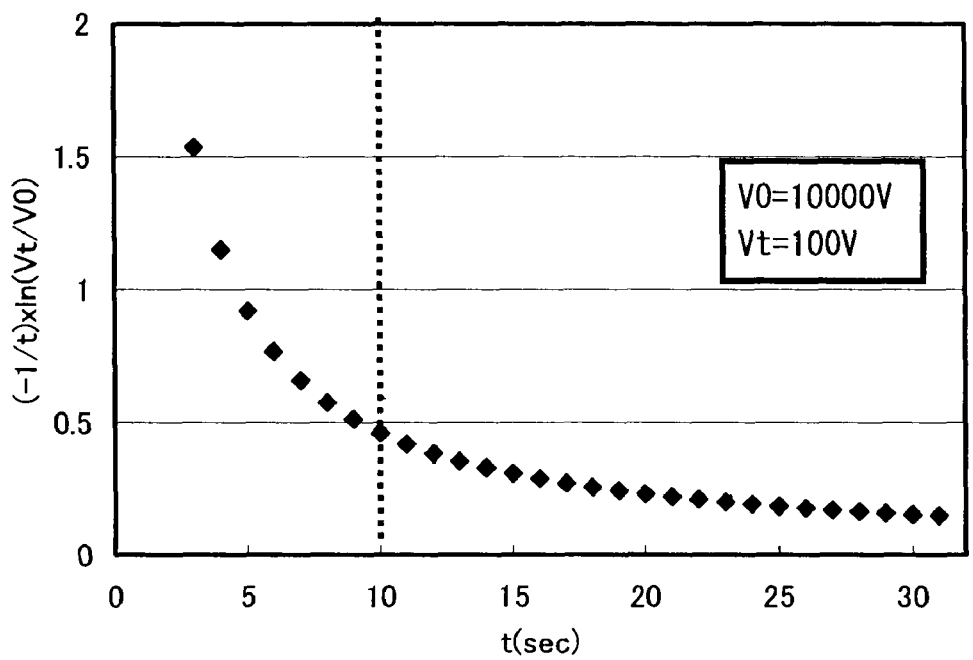
FIGS. 5A and 5B are graphs showing values expressed by the formula $(-1/t) \times \ln(Vt/V0)$ after the lapse of a disappearance time t (sec)
Figure 5B:
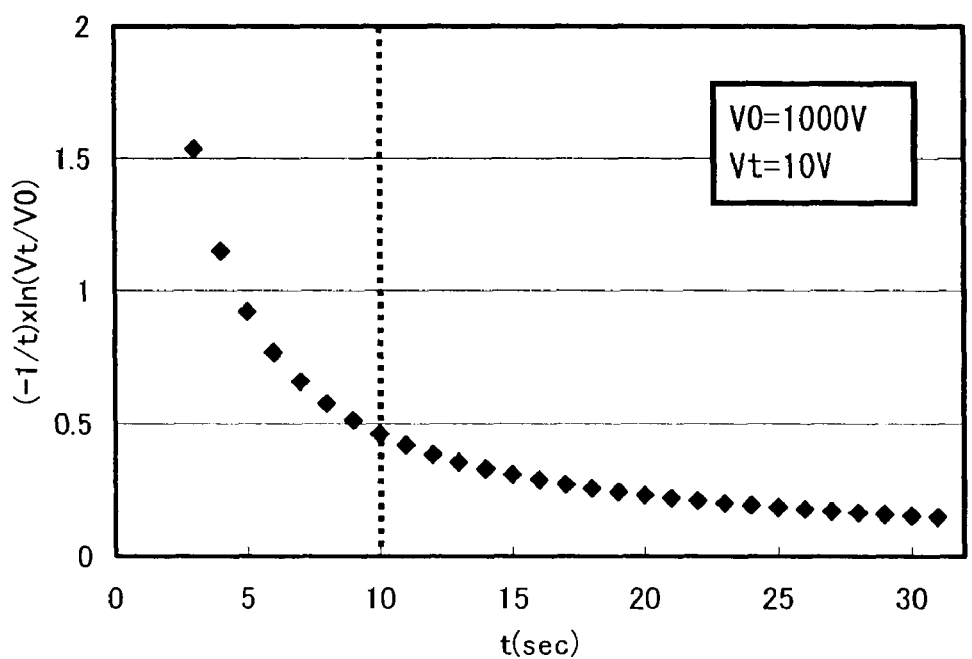

FIGS. 5A and 5B show graphs in which the part of the equation (8) relating to the electricity removal performance, i.e., (−1/t)×ln(Vt/V0) is plotted against the disappearance time in an example where the initial electrification voltage V0=10000 (V) and Vt=100 (V), i.e., one hundredth of the initial electrification voltage, and an example where the initial electrification voltage V0=1000 (V) and Vt=10 (V), i.e., one hundredth of the initial electrification voltage, respectively, in order to evaluate values necessary to obtain substantially sufficient electricity removal capability.

When attention is focused on the points at the desired disappearance time of 10 sec (indicated by the dotted lines) in both FIGS. 5A and 5B, which result in the identical graphs, it can be estimated that substantially sufficient electricity removal performance to one hundredth of the initial electrification voltage can be achieved within the desired disappearance time of 10 sec if the value expressed by the term (−1/t)× ln(Vt/V0) is equal to or less than 0.5. By substituting the value 0.5 for the term (−1/t)×ln(Vt/V0) in the equation (8), the relation expressed by the equation (1) is obtained. By optimizing the thickness of the transparent conductive film 30 so as to satisfy the equation (1), it is possible to suppress the effect of static electricity and improve the display performance.

Furthermore, the transmittance of the transparent conductive film 30 is preferably equal to or greater than 97% at a wavelength of 550 nm. That is, if the film thickness of the transparent conductive film 30 satisfying the condition that the transmittance of the transparent conductive film 30 is equal to or greater than 97% at a wavelength of 550 nm is dt (cm), the thickness d1 (cm) of the transparent conductive film 30 should be adjusted so as to satisfy the following formula.

$$d1 < dt$$

In this way, it is possible to minimize the reduction in the transmittance of the transparent conductive film 30, and thus prevent the deterioration of the display performance. Furthermore, the film hardness of the transparent conductive film 30 is preferably equal to or greater than 3 H. In this way, it is possible to prevent the occurrence of scratches on the surface of the transparent conductive film 30.

Figure 6:
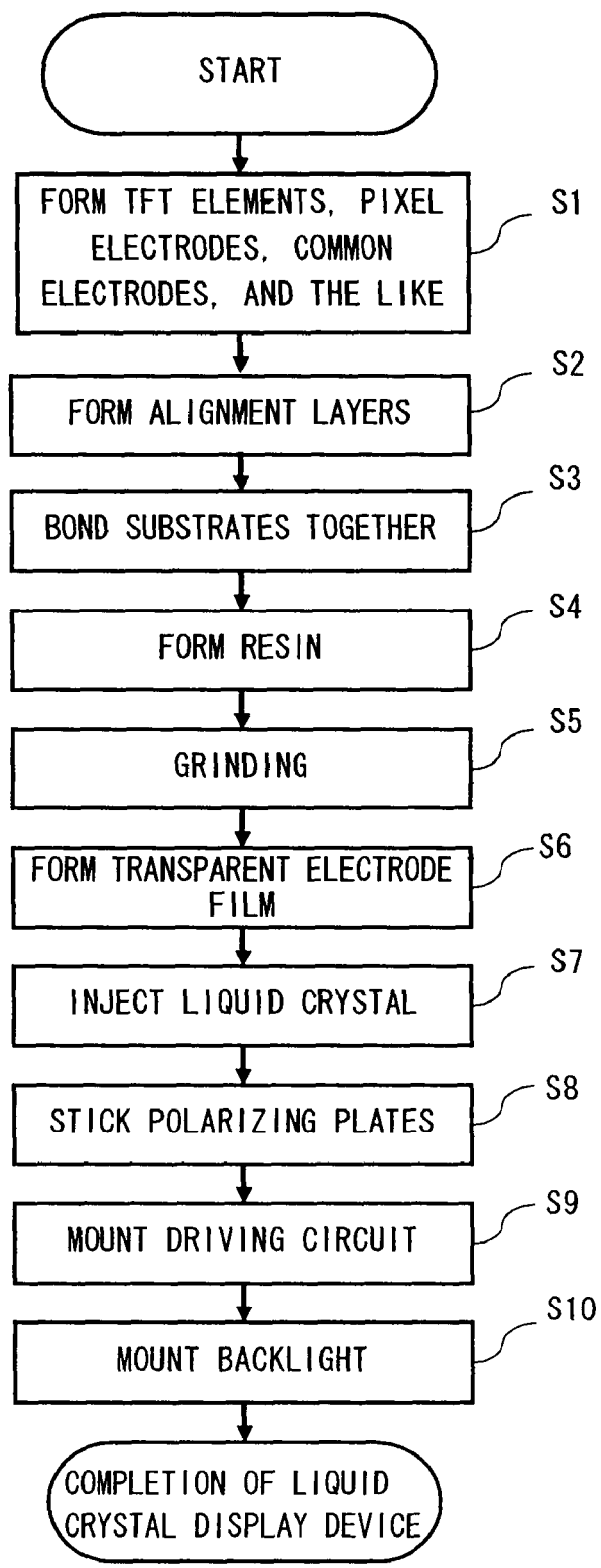
FIG. 6 is a flow diagram for illustrating a method of manufacturing a liquid crystal display device in accordance with an embodiment of the present invention.
Figure 7A:
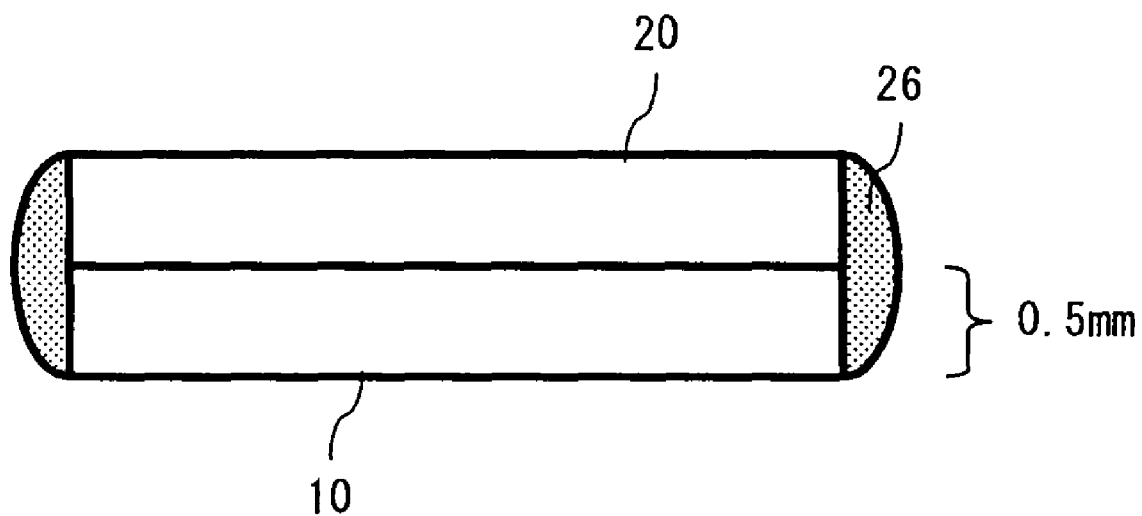
FIGS. 7A and 7B show parts of a manufacturing process of a liquid crystal display device in accordance with an embodiment of the present invention.
Figure 7B:
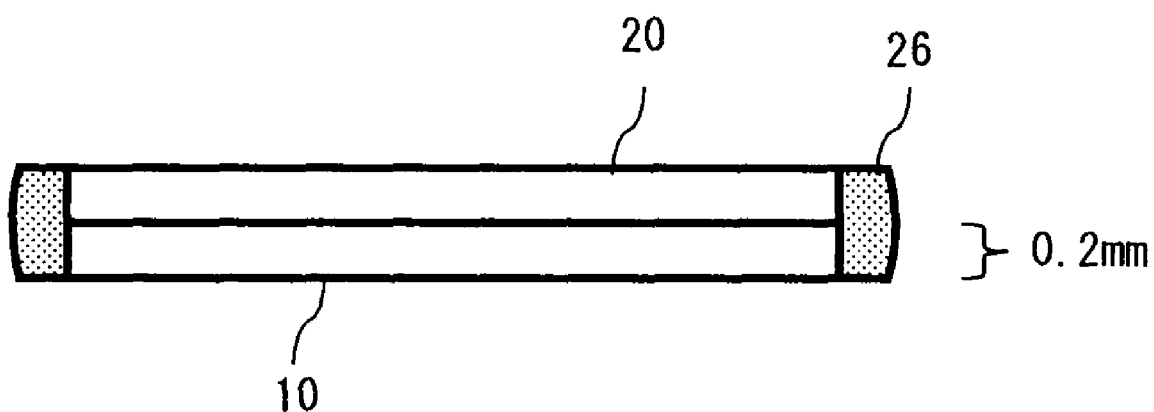

Next, a method of manufacturing a liquid crystal display device 100 in accordance with this embodiment of the present invention is explained hereinafter with reference to FIG. 6. FIG. 6 is a flow diagram for illustrating a method of manufacturing a liquid crystal display device 100 in accordance with this embodiment of the present invention. Furthermore, FIGS. 7A and 7B are figures for illustrating a process to reduce the thicknesses of the electrode substrate 10 and the opposed substrate 20 constituting a part of the liquid crystal panel 101.

As shown in FIG. 6, TFTs 24, pixel electrodes 13, common electrodes 14, lines, and the likes are formed on the electrode substrate 10 in the first place. Furthermore, a color filter 21 and the like is formed on the opposed substrate 20 (step S1). A glass substrate having a thickness of about 0.5 mm is used for each of the electrode substrate 10 and the opposed substrate 20.

Next, alignment layers 18 on which an alignment process is carried out in a specific direction are formed on the electrode formation surface and the color filer formation surface of the respective substrates (step S2). Then, the electrode substrate 10 and the opposed substrate 20 are bonded to each other with spacers 17 interposed therebetween by sealing material 15 such that the electrode formation surface of the electrode substrate 10 and the color filter formation surface of the opposed substrate 20 are opposed to each other (step S3). Then, the peripheral opening portion of the bonded electrode substrate 10 and opposed substrate 20 are closed by using resin 26 (step S4). In this way, a hermetically sealed state is created between the electrode substrate 10 and the opposed substrate 20 by sealing the peripheral gap between the electrode substrate 10 and the opposed substrate 20 as shown in FIG. 7A.

Then, after the electrode substrate 10 and the opposed substrate 20 are bonded together, the thickness of both substrates is reduced by grinding (step S5). For example, the substrates can be thinned by physical grinding such as buffing, or chemical grinding such as etching. As shown in FIG. 7B, each of the electrode substrate 10 and the opposed substrate 20 is thinned to about 0.2 mm. Then, brush cleaning and UV cleaning are carried out to remove contaminants by the grinding.

After that, a transparent conductive film 30 is formed on the surface of the opposed substrate 20 opposite to the side of liquid crystal 16 (step S6). For example, it is applied on the glass substrate by a spin coat method using a solution containing tin oxide doped with antimony oxide (which is called "ATO solution" hereinafter). Then, the transparent conductive film 30 is formed by carrying out preliminary drying and calcining. As described above, the thickness d1 (cm) of the transparent conductive film 30 is adjusted so as to satisfy the following formula.

$$d1 > 0.5 \times R1 \times \in 0 \times \in r \times S/d0 \text{ (cm)}$$

Furthermore, if the film thickness of the transparent conductive film 30 satisfying the condition that the transmittance of the transparent conductive film 30 is equal to or greater than 97% at a wavelength of 550 nm is dt (cm), the thickness d1 (cm) of the transparent conductive film 30 should be adjusted so as to satisfy the following formula.

$$d1 < dt$$

In this way, it is possible to suppress the effect of static electricity and improve the display performance.

Then, the electrode substrate 10 and the opposed substrate 20 are severed, and liquid crystal is injected (step S7). Then, a polarizing plate and the like are stuck on the outer surface of each of the substrates constituting a part of the liquid crystal panel 101 (step S8), and a driving circuit is mounted (step S9). In this way, the manufacture of the liquid crystal panel 101 is completed. After that, a backlight 102 is mounted on the back surface of the liquid crystal panel 101 (step S10).

In the past, in the case where a transparent conductive film is formed by the application of coating after the thinning process is carried out on the substrate, since the optimal value for the film thickness of the transparent conductive film has not been clearly established, the conductive films have been formed with a film thickness thicker than necessary and thereby causing problems such as a reduction in the transmittance. However, the present invention can define the optimal value for the thickness of the transparent conductive film 30, and therefore can prevent the deterioration of display performance while being able to suppress the effect of static electricity.

Examples in accordance with the present invention and comparative examples are explained hereinafter.

EXAMPLE 1

A pair of superimposed substrates composed of an electrode substrate 10 on which a pattern was formed for a horizontal electric field mode and an opposed substrate 20 on which a color filter 21 was formed for color display was prepared by a certain process. AN100 (Asahi Glass Co., Ltd.) glass substrates were used for the electrode substrate 10 and the opposed substrate 20. Then, the peripheral opining portion was closed by using UV resin in order to reduce the thickness of the glasses by grinding.

As shown in FIGS. 7A and 7B, each glass (each side) was ground from 0.5 mm to 0.2 mm by a certain process. Brush cleaning and UV cleaning were carried out to remove contaminants by the grinding. After that, a solution containing tin oxide doped with antimony oxide (ATO solution) was applied as the transparent conductive film 30 to the glass substrate by a spin coat method.

The solvent was removed by carrying out preliminary drying for 5 minutes at 60° C., and the substrates were calcined for 30 minutes at 150° C. In this way, a transparent conductive film 30 having a film thickness of 300 nm, a specific resistance of $5 \times 10^4$ Ω·cm, and transmittance of 97% or higher at a wavelength of 550 nm was formed on the opposed substrate 20. This transparent conductive film 30 satisfied the above-described equation $d1 > 0.5 \times R1 \times \in_0 \times \in_r \times S / d0$. Incidentally, the calculation was carried out with the assumption that the electric constant $\in_0$ was $85 \times 10^{-12}$ (F/m) and the relative dielectric constant $\in_r$ of the glass was 5.2. Furthermore, the evaluation of the film characteristics showed the hardness was 4 H (conforming to JIS-K5400 standards), adhesive forth to the substrate was 8 points (conforming to JIS-K5400 standards), and the haze was 0.4% (JIS-K7105 standards).

Then, a liquid crystal display device having a 2.4-inch diagonal display area was manufactured by carrying out certain processes such as glass cutting and liquid crystal injection. Furthermore, the transparent conductive film 30 had such a structure that it was electrically connected to a ground through the frame or the driving circuit.

As a result, a liquid crystal display device that did not have abnormal display even when the surface was electrified and did have excellent display performance including high transmittance, low surface reflectivity, and low glare was obtained. Furthermore, needless to say, the reflectivity could be reduced by optimizing the film thickness and the refractivity. Furthermore, a film containing metal oxide such as ITO, zinc oxide, and tin oxide, or a conductive polymer such as polythiophene and polypyrrole can be used for the transparent conductive film 30.

EXAMPLE 2

A liquid crystal display device having a 10.4-inch diagonal display area was manufactured by applying an ATO solution to the back surface (the surface opposite to the surface contacting with the liquid crystal 16) of the opposed substrate 20 by a spray method. A UV curing type solution containing ATO and acrylic resin was used as the ATO solution. The curing condition was irradiation of 100 mJ. A transparent conductive film 30 having a film thickness of 300 nm, transmittance of 97% or higher, and a specific resistance of $5 \times 10^3$ Ω·cm was obtained. Note that the liquid crystal display device was manufactured by the same manufacturing method as Example 1 except for the technical matters described above. As a result, a liquid crystal display device that did not have abnormal display even when the surface of the liquid crystal panel 101 was electrified and did have excellent display performance including high transmittance was obtained.

EXAMPLE 3

A liquid crystal display device having a 30-inch diagonal display area was manufactured by applying a solution containing conductive polymer (polythiophene) as the transparent conductive film 30 to the back surface (the surface opposite to the surface contacting with the liquid crystal 16) of the opposed substrate 20 by a slit coat method. The glass thickness was 0.3 mm, and a transparent conductive film 30 having a film thickness of 300 nm, transmittance of 97% or higher, and a specific resistance of 100 Ω·cm was obtained. Note that the liquid crystal display device was manufactured by the same manufacturing method as Example 1 except for the technical matters described above. As a result, a liquid crystal display device that did not have abnormal display even when the surface was electrified and did have excellent display performance including high transmittance was obtained.

COMPARATIVE EXAMPLE 1

A liquid crystal display device having a 2.4-inch diagonal display area of the liquid crystal panel 101 was manufactured by applying an ATO solution as the transparent conductive film 30 to the back surface (the surface opposite to the surface contacting with the liquid crystal 16) of the opposed substrate 20 by a spray method. The calcining temperature was 100° C. The film thickness of the transparent conductive film 30 was 50 nm, the transmittance was 97% or higher, the film hardness was 2 H, and the specific resistance was $5 \times 10^4$ (Ω·cm). The liquid crystal display device was manufactured by the same manufacturing method as Example 1 except for the technical matters described above. In consequence, scratches occurred on the surface because of low film hardness. Furthermore, abnormal display occurred when the surface was electrified, and no liquid crystal display device having excellent display performance was obtained.

COMPARATIVE EXAMPLE 2

A liquid crystal display device having a 30-inch diagonal display area of the liquid crystal panel 101 was manufactured by forming an ITO film as the transparent conductive film 30 on the back surface (the surface opposite to the surface contacting with the liquid crystal 16) of the opposed substrate 20 by a sputtering method. The film thickness of the transparent conductive film 30 was 50 nm, and the transmittance was 93%. The specific resistance of the film was $5 \times 10^{-3}$ ($\Omega \cdot cm$). The liquid crystal display device was manufactured by the same manufacturing method as Example 1 except for the technical matters described above. In consequence, the transmittance was low, the brightness was reduced, and no liquid crystal display device having excellent display performance was obtained.

As has been explained so far, the present invention can provide a liquid crystal display device that is capable of minimizing faulty display even if high electrical potential such as static electricity is applied from the outside, and has excellent display performance including high transmittance.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
   a liquid crystal panel comprising:
   a first substrate;
   a second substrate disposed opposite to the first substrate; and
   liquid crystal sandwiched between the first and second substrates; and
   a transparent conductive film formed on the opposite surface of the first substrate to the liquid crystal;
   wherein the thickness d1 (cm) of the transparent conductive film satisfies a following equation:

$d1 > 0.5 \times R1 \times \in 0 \times \in r \times S/d0$ (cm)

where R1 ($\Omega \cdot cm$) is specific resistance of the transparent conductive film, $\in 0$ (F/m) is the electric constant, $\in r$ (F/m) is relative dielectric constant of the first substrate, d0 (cm) is thickness of the first substrate, and S ($m^2$) is size of the display area of the liquid crystal panel.

2. The liquid crystal display device according to claim 1, wherein the transmittance of the transparent conductive film is equal to or greater than 97% at a wavelength of 550 nm.

3. The liquid crystal display device according to claim 1, wherein the transparent conductive film contains metal oxide.

4. The liquid crystal display device according to claim 1, wherein the transparent conductive film contains conductive polymer.

5. The liquid crystal display device according to claim 1, wherein the film hardness of the transparent conductive film is equal to or greater than 3 H.

6. The liquid crystal display device according to claim 1, wherein a pixel electrode and a common electrode to drive the liquid crystal are formed only on the second substrate.

7. A method of manufacturing a liquid crystal display device comprising:
   forming a liquid crystal panel by injecting liquid crystal between a first and second substrates; and
   forming a transparent conductive film on the opposite surface of the first substrate to the liquid crystal; wherein the transparent conductive film satisfies a following equation:

$d1 > 0.5 \times R1 \times \in 0 \times \in r \times S/d0$ (cm)

where R1 ($\Omega \cdot cm$) is specific resistance of the transparent conductive film, d1 (cm) is film thickness of the transparent conductive film, $\in 0$ (F/m) is the electric constant, $\in r$ (F/m) is relative dielectric constant of the first substrate, d0 (cm) is thickness of the first substrate, and S ($m^2$) is size of the display area of the liquid crystal panel.

8. The method of manufacturing a liquid crystal display device according to claim 7, wherein if the film thickness satisfying the condition that the transmittance of the transparent conductive film is equal to or greater than 97% at a wavelength of 550 nm is dt (cm), the thickness d1 (cm) of the transparent conductive film is adjusted so as to satisfy the following formula:

$d1 < dt$.

9. The method of manufacturing a liquid crystal display device according to claim 7, further comprising:
   thinning the first and second substrates after the formation of the liquid crystal panel; and
   forming the transparent conductive film after the thinning step.

10. The method of manufacturing a liquid crystal display device according to claim 7, wherein the transparent conductive film is formed by a coating method.

11. The method of manufacturing a liquid crystal display device according to claim 7, further comprising forming a pixel electrode and a common electrode to drive the liquid crystal only on the second substrate.

12. The method of manufacturing a liquid crystal display device according to claim 7, wherein the transparent conductive film contains metal oxide.

13. The method of manufacturing a liquid crystal display device according to claim 7, wherein the transparent conductive film contains conductive polymer.

14. The method of manufacturing a liquid crystal display device according to claim 7, wherein the film hardness of the transparent conductive film is equal to or greater than 3 H.

* * * * *